June 21, 1938.   S. G. CONKLING   2,121,339
SHOCK ABSORBER
Filed May 25, 1936
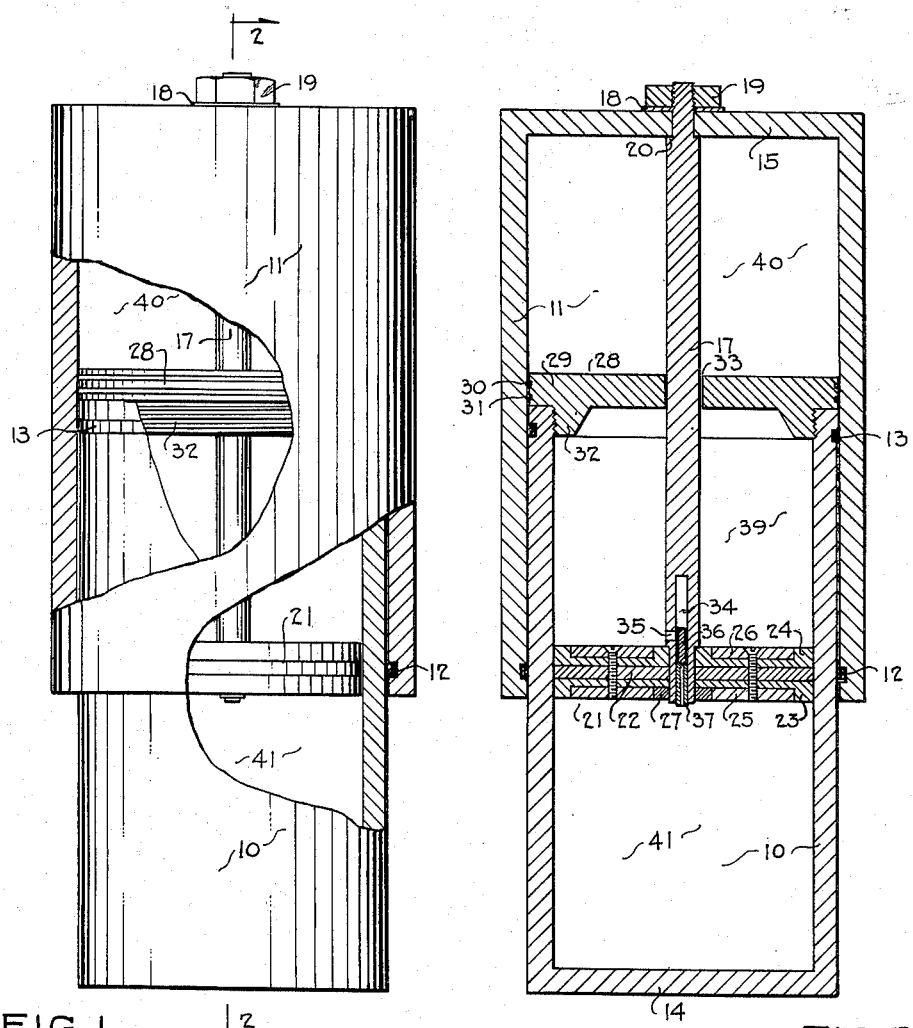
FIG. 1
FIG. 2
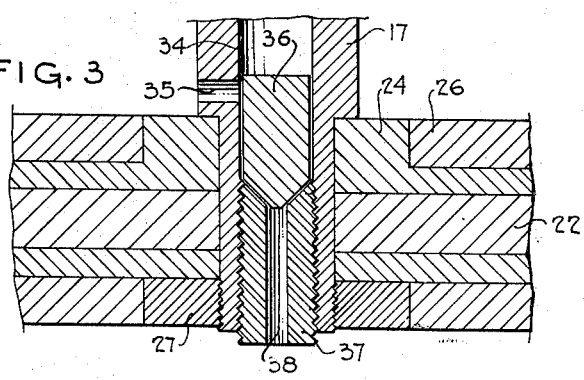
FIG. 3
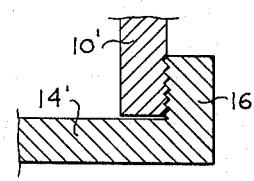
FIG. 4
INVENTOR
S. G. CONKLING.
BY
ATTORNEY Patented June 21, 1938

2,121,339

UNITED STATES PATENT OFFICE 2,121,339

SHOCK ABSORBER

Samuel G. Conkling, Brooklyn, N. Y.

Application May 25, 1936, Serial No. 81,749

1 Claim. (Cl. 188—88)

This invention relates to new and useful improvements in shock absorbers, and it has for its specific purpose to provide a further improvement in regard to my shock absorbers, patented in the United States, Feb. 5, 1918, under Patent No. 1,255,513; and May 27, 1919, under Patent No. 1,305,065.

Proceeding further on the same basic principles employed in the construction discussed in the above mentioned patents, as to the imprisoned air, it is quite obvious that my new device with its double compression method will establish and provide an absolutely evenly balanced air-cushion, and a more powerful device, as the imprisoned air herein will automatically respond to every form of percussion.

A further object of this invention is to provide a device without springs of any kind, thereby eliminating the inconvenience of repair due to worn out and broken springs.

With the above and other objects in view, this invention consists of the novel features of construction, combination and arrangement of parts hereinafter fully described, claimed and illustrated in the accompanying drawing forming part of this application, and in which similar characters of reference indicate corresponding parts in all views, and in which:

Figure 1 is a side elevational view of my invention, part of the cylinders, hereinafter described, being broken off, in order better to clarify the construction.

Figure 2 is a transverse sectional view on the line 2—2 in Figure 1.

Figure 3 is an enlarged detail transverse sectional view; while

Figure 4 is another detail view, showing a somewhat modified construction of my device.

Referring more particularly to the drawing, 10 and 11 indicate two telescoping cylinders, the lower and narrower one, 10, being made to slide within the upper or wider one, 11; said cylinders are provided with two piston rings 12 and 13, which rings are made to assure that the air within the cylinders will not escape therefrom.

Said piston rings may, of course, be made from any approved good material, and have packings arranged thereon.

Endpieces 14 and 15 may be welded on to the cylinders, or may, as shown, for instance, in the modification in Figure 4 at 14' be secured to the latter by a threaded portion on the cylinder 10' and a correspondingly threaded ring-formed collar 16.

A piston rod 17 is secured to the endpiece 15 by means of a washer 18 and a nut 19. The shoulder 20 is constructed to make a close fitting against the inside of said endpiece. To the other end of the rod is securely fastened a piston 21. The latter may be of any suitable construction; herein, however, has been indicated an especially constructed piston, consisting of an intermediate plate 22, cup-shaped washers 23 and 24, which are held in place by plates 25 and 26, secured by nuts or screws, and fastened to the said rod by means of an inwardly threaded ring member 27.

In the upper or open end of the inner cylinder 10, another piston 28 of a somewhat different construction is mounted. Said latter piston consists of a ring-formed metal plate 29, provided with two piston rings 30 and 31, a collar 32 being correspondingly threaded to the inwardly threaded upper portion of the cylinder 10. This piston is furthermore provided with a central opening 33 so constructed that the piston rod 17 will slide freely through the same, permitting only a limited amount of air to pass through.

As may be especially seen in Figure 3, the cylinder rod 17 is provided with a central bore, or passage, 34, open at the bottom and provided with a side opening 35 above the piston 21. A valve 36 is inserted in to said bore and held in place by a ring formed stopper 37 screwed in to the end of said bore. The upper cone-shaped end of said stopper serves the purpose of a seat for the valve, which is correspondingly shaped.

When my device installed, for instance, in an automobile is exposed to a shock or pressure, the two cylinders 10 and 11 will have a tendency to telescope one in to the other, thereby creating by means of the two pistons 28 and 21, a compression in the two chambers 40 and 41.

The compression in the lower chamber 41 will force the air through the opening 38 in the stopper 37 and lift the valve, thereby exposing the side opening 35 giving the air access to the middle chamber 39. The compressed air in the top chamber 40 has, as before described, the limited space between the piston rod and the sides of the opening in the piston, whereby the air will be forced through to the middle chamber 39.

Upon movement of the piston 21 in an upward direction, air from the chamber 39 will slowly be returned to the chamber 41 by means of the small spaces which naturally exist between said piston and the walls of the cylinder.

When the pressure ceases the reaction of the automobile springs naturally will have a tendency to pull the cylinders apart, and now the suction thus created in the two chambers 40 and 41 will prevent the sudden rebound of said springs.

There appears to be no reason why a slow moving liquid, such as oil, could not be used in my device. This might be an advantage, where my device is used on trucks, or other heavy vehicle, or as a strut for aeroplanes.

It is obvious that changes may be made in the form, construction and arrangement of the several parts, as shown, within the scope of the appended claim, without departing from the spirit of the invention, and I do not therefore wish to limit myself to the construction and arrangement shown and described herein.

What I claim as new, and desire to secure by Letters Patent of the United States, is:—

A shock absorber, comprising a pair of cylinders, one telescoping within the other, endpieces closing the outer ends of said cylinders, piston rings, with packings arranged thereon, mounted in the outer side of the inner cylinder and the inner side of the outer cylinder, respectively, whereby to prevent the ingress or egress of air to and from said cylinders, two pistons cooperating with said cylinders, a piston rod connecting one of the pistons to the endpiece of the outer cylinder, a recessed portion formed on the upper end of said rod, a threaded portion on the latter, a washer, and a nut, whereby to secure said rod to the cylinder, a recessed portion on the lower end of said rod, a threaded lower portion upon the latter, said rod being provided with a bore and a side opening into the latter, a valve mounted in said bore, and an outwardly threaded ring-shaped stopper secured to the lower end of the rod, said stopper being provided with an upper cone-shaped end portion adapted to receive said valve thereon, the lower piston consisting of an intermediate plate and having cup-shaped washers arranged in connection therewith, the upper piston consisting of a ring-shaped metal plate, two piston rings arranged thereon, a collar forming part of said piston and being threaded to the upper portion of the lower cylinder, substantially as shown and described.

SAMUEL G. CONKLING.